US008897120B2

(12) United States Patent
Stadelmeier et al.

(10) Patent No.: US 8,897,120 B2
(45) Date of Patent: *Nov. 25, 2014

(54) FRAME AND TRAINING PATTERN STRUCTURE FOR MULTI-CARRIER SYSTEMS

(75) Inventors: Lothar Stadelmeier, Stuttgart (DE); Dietmar Schill, Winnenden (DE); Samuel Asangbeng Atungsiri, Basingstoke (GB); Antonio Alarcon Gonzalez, Viladecans (ES)

(73) Assignee: Sony Corporation, Tokyo (JP)

( * ) Notice: Subject to any disclaimer, the term of this patent is extended or adjusted under 35 U.S.C. 154(b) by 81 days.

This patent is subject to a terminal disclaimer.

(21) Appl. No.: 13/485,248

(22) Filed: May 31, 2012

(65) Prior Publication Data

US 2012/0236880 A1 Sep. 20, 2012

Related U.S. Application Data

(63) Continuation of application No. 12/437,161, filed on May 7, 2009, now Pat. No. 8,274,878.

(30) Foreign Application Priority Data

Jun. 4, 2008 (EP) .................................... 08157548
Jun. 4, 2008 (EP) .................................... 08157549
Jun. 13, 2008 (EP) .................................... 08158271
Jun. 13, 2008 (EP) .................................... 08158274

(51) Int. Cl.
*H04J 11/00* (2006.01)

(52) U.S. Cl.
USPC ........... 370/203; 370/204; 370/206; 370/208; 370/210; 375/130; 375/259; 375/260

(58) Field of Classification Search
CPC ............. H04J 11/0069; H04L 27/2655; H04L 27/2601; H04L 27/2602; H04L 27/2613; H04L 27/2626; H04L 27/2646; H04L 27/2666
USPC .......... 370/203–211, 430; 375/130, 259–260, 375/268
See application file for complete search history.

(56) References Cited

U.S. PATENT DOCUMENTS

| | | | |
|---|---|---|---|
| 5,208,835 | A | 5/1993 | Weeks et al. |
| 5,867,478 | A | 2/1999 | Baum et al. |

(Continued)

FOREIGN PATENT DOCUMENTS

| | | | |
|---|---|---|---|
| CN | 1825840 | A | 8/2006 |
| CN | 101064577 | A | 10/2007 |

(Continued)

OTHER PUBLICATIONS

U.S. Appl. No. 13/676,952, filed Nov. 14, 2012, Stadelmeier, et al.

(Continued)

*Primary Examiner* — Benjamin H Elliott, IV
(74) *Attorney, Agent, or Firm* — Oblon, Spivak, McClelland, Maier & Neustadt, L.L.P.

(57) ABSTRACT

A transmitting apparatus for transmitting signals in a multi carrier system on the basis of a frame structure, each frame comprising at least two preamble patterns adjacent to each other in the frequency direction and at least two data patterns, said transmitting apparatus comprising a pilot mapper configured to map the same sequence of pilot signals on frequency carriers of each of said at least two preamble patterns in a frame, each preamble pattern having the same length, a data mapper configured to map data on frequency carriers of said at least two data patterns in a frame a transformer configured to transform said preamble patterns and said data patterns from the frequency domain into the time domain in order to generate a time domain transmission signal, and a transmitter configured transmit said transmission signal.

23 Claims, 7 Drawing Sheets

(56) References Cited

U.S. PATENT DOCUMENTS

Figures 4A, 4B:
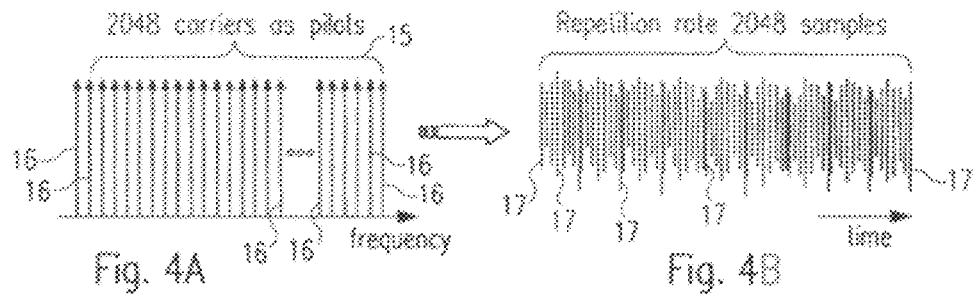

| | | |
|---|---|---|
| 6,470,030 B1 | 10/2002 | Park et al. |
| 6,760,362 B2 | 7/2004 | Patel et al. |
| 6,952,182 B2 | 10/2005 | Spilker et al. |
| 7,039,004 B2 | 5/2006 | Sun et al. |
| 7,075,949 B2 | 7/2006 | Okada et al. |
| 7,098,967 B2 | 8/2006 | Kanno et al. |
| 7,233,625 B2 | 6/2007 | Ma et al. |
| 7,260,055 B2 | 8/2007 | Wang et al. |
| 7,304,939 B2 | 12/2007 | Steer et al. |
| 7,349,436 B2 | 3/2008 | Maltsev et al. |
| 7,352,691 B2 | 4/2008 | Hagen et al. |
| 7,366,262 B2 | 4/2008 | Shin et al. |
| 7,492,699 B2 | 2/2009 | Cho |
| 7,639,660 B2 | 12/2009 | Kim et al. |
| 7,787,431 B2 | 8/2010 | Li et al. |
| 7,792,201 B2 | 9/2010 | Lee et al. |
| 2003/0043732 A1 | 3/2003 | Walton et al. |
| 2004/0013084 A1 | 1/2004 | Thomas et al. |
| 2004/0180635 A1 | 9/2004 | Choi et al. |
| 2005/0105505 A1 | 5/2005 | Fishler et al. |
| 2006/0013285 A1 | 1/2006 | Kobayashi et al. |
| 2006/0088112 A1 | 4/2006 | Das et al. |
| 2006/0088116 A1 | 4/2006 | Chen et al. |
| 2006/0114812 A1 | 6/2006 | Kim et al. |
| 2007/0268975 A1 | 11/2007 | Yoon et al. |
| 2007/0297323 A1 | 12/2007 | Seki |
| 2008/0043858 A1 | 2/2008 | Lim et al. |
| 2008/0084940 A1 | 4/2008 | Hou |
| 2008/0095255 A1 | 4/2008 | Tanaka et al. |
| 2008/0107011 A1 | 5/2008 | Yang |
| 2008/0159436 A1 | 7/2008 | Cho et al. |
| 2009/0052427 A1 | 2/2009 | Oketani et al. |
| 2009/0109948 A1 | 4/2009 | Bauernfeind |
| 2009/0116374 A1 | 5/2009 | Henriksson et al. |
| 2009/0135802 A1 | 5/2009 | Haga et al. |
| 2009/0161652 A1 | 6/2009 | Chang et al. |
| 2009/0196163 A1 | 8/2009 | Du |
| 2009/0232062 A1 | 9/2009 | Higuchi et al. |
| 2009/0296839 A1 | 12/2009 | Stadelmeier et al. |
| 2009/0296843 A1 | 12/2009 | Gu et al. |
| 2009/0304023 A1 | 12/2009 | Stadelmeier et al. |
| 2009/0304099 A1 | 12/2009 | Waller et al. |
| 2010/0034219 A1 | 2/2010 | Stadelmeier et al. |
| 2010/0135316 A1 | 6/2010 | Atungsiri et al. |
| 2012/0236880 A1* | 9/2012 | Stadelmeier et al. ......... 370/498 |

FOREIGN PATENT DOCUMENTS

| | | |
|---|---|---|
| CN | 101175060 A | 5/2008 |
| EP | 0 732 832 A1 | 9/1996 |
| EP | 1 650 921 A2 | 4/2006 |
| EP | 1650921 A2 | 4/2006 |
| RU | 2 296 435 C2 | 3/2007 |
| WO | WO 03/005742 A1 | 1/2003 |
| WO | WO 2004/028055 A1 | 4/2004 |
| WO | WO 2005/041515 A1 | 5/2005 |
| WO | WO 2006/072103 A1 | 7/2006 |
| WO | WO 2007/083569 A1 | 7/2007 |

OTHER PUBLICATIONS

Office Action issued Mar. 4, 2013 in Australian Application No. 2009201904.

Communication pursuant to Article 94(3) EPC issued Mar. 22, 2012, in European Patent Application No. 09 251 476.9.

DVB-T2 Concept by BBC, Nokia & Teracom, XP-017817443, Jun. 2007, 73 pages.

U.S. Appl. No. 13/372,255, filed Feb. 13, 2012, Stadelmeier, et al.

U.S. Appl. No. 13/486,473, filed Jun. 1, 2012, Stadelmeier, et al.

U.S. Appl. No. 13/458,316, filed Apr. 27, 2012, Stadelmeier, et al.

Office Action Issued on Nov. 8, 2011, in Chinese Application No. 200910141545.3 (with English translation).

Digital Video Broadcasting (DVB); "Second Generation Framing Structure, Channel Coding and Modulation Systems for Broadcasting, Interactive Services, News Gathering and Other Broadband Satellite Applications (DVB-S2)", ETSI EN 302 307 (V1.2.1), European Standard (Telecommunications Series), Aug. 2009, 78 pages.

Digital Video Broadcasting (DVB); "Frame Structure Channel Coding and Modulation for a Second Generation Digital Terrestrial Television Broadcasting System (DVB-T2)", ETSI EN 302 755 (V1.1.1), European Standard (Telecommunications Series), Sep. 2009, 167 pages.

Digital Video Broadcasting (DVB); "Framing Structure, Channel Coding and Modulation for Digital Terrestrial Television", ETSI EN 300 744 (V1.5.1), European Standard (Telecommunications Series), Nov. 2004, 64 pages.

"Data Over Cable Service Interface Specifications DOCSIS 3.0", Physical Layer Specification CM-SP-PHYv3.0-108-090121, Jan. 21, 2009,169 pages.

"Transmission System for Digital Terrestrial Television Broadcasting", ARIB Standard, ARIB STD-B31 Version 1.6, Association of Radio Industries and Businesses, Nov. 30, 2005,172 pages.

Michael Speth, et al., "Optimum Receiver Design for OFDM-Based Broadband Transmission—Part II: A Case Study", IEEE Transactions on Communications, vol. 49, No. 4, Apr. 2001, pp. 571-578.

Stefan H. Müller-Weinfurtner, "OFDM for Wireless Communications: Nyquist Windowing, Peak-Power Reduction, and Synchronization", 2000, ISBN 3-8265-7658-6,117 pages.

Office Action issued Oct. 26, 2011 in Chinese Patent Application No. 200910141552.3 (English translation only).

Search Report issued Sep. 30, 2009 in Eurasian Patent Application No. 200900655.

Combined Taiwanese Office Action and Search Report issued Dec. 18, 2013 in Patent Application No. 098115689 (with English language translation).

Search Report issued Feb. 12, 2014 in Taiwanese Patent Application No. 098115560.

Office Action issued Jul. 11, 2014, in European Patent Application No. 08158271.0.

* cited by examiner

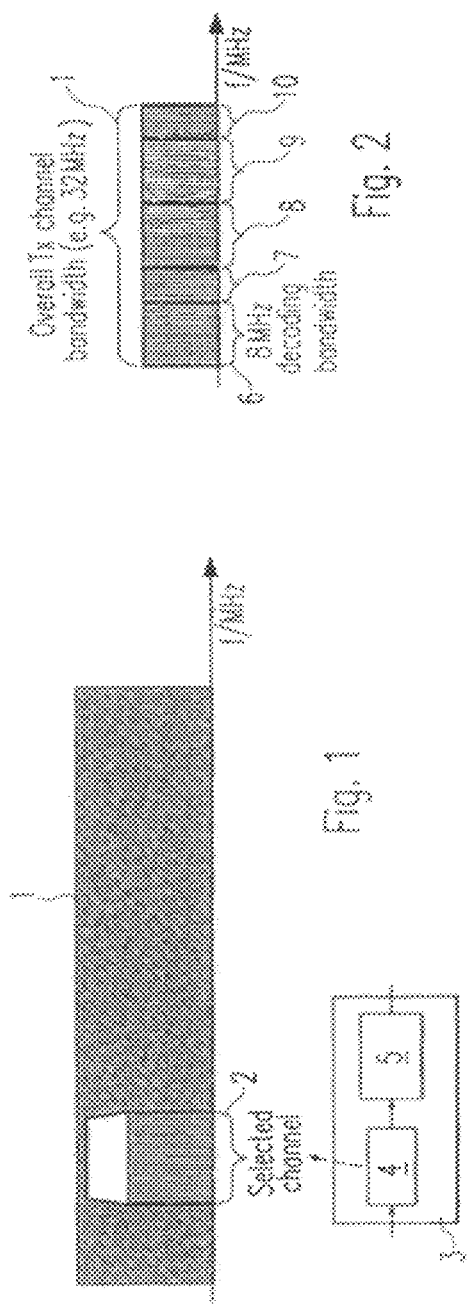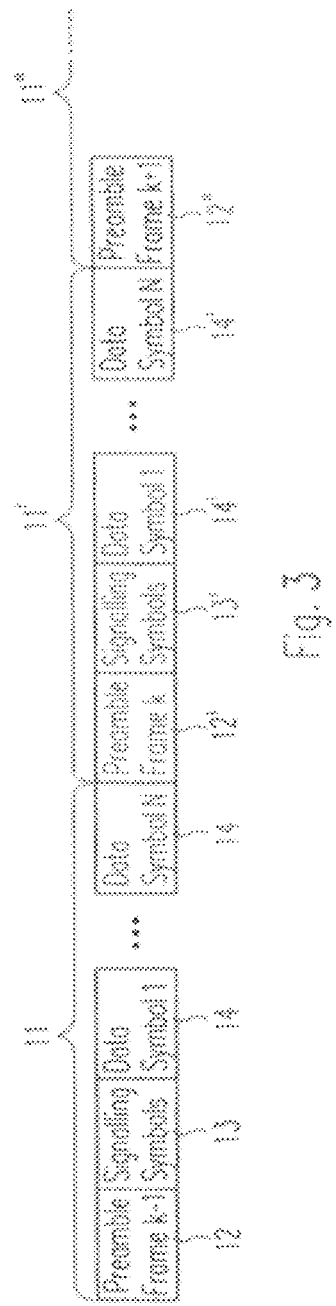

FRAME AND TRAINING PATTERN STRUCTURE FOR MULTI-CARRIER SYSTEMS

CROSS-REFERENCE TO RELATED APPLICATION

The present application is a continuation application of U.S. application Ser. No. 12/437,161, filed May 7, 2009, the entire contents of which are incorporated herein by reference. This application also claims priority to European Patent Applications Nos. 08157549.0, filed Jun. 4, 2008; 08157548.2, filed Jun. 4, 2008; 08158271.0, filed Jun. 13, 2008; and 08158274.4, filed Jun. 13, 2008.

The present invention is directed to a new frame and training pattern structure for multi-carrier systems.

The present invention is hereby mainly directed (but not limited) to broadcast systems, such as for example cable based or terrestrial digital broadcast systems, in which content data, signalling data, pilot signals and so forth are mapped on to a plurality of frequency carriers, which are then transmitted in a given overall or complete transmission bandwidth. The receiver typically tunes to a partial channel (part of the overall transmission bandwidth) out of the complete transmission bandwidth (sometimes called segmented reception) in order to receive only the content data which are necessary or wanted by the respective receiver. For example, in the ISDB-T standard, the overall channel bandwidth is hereby divided into 13 fixed segments of an equal length (equal number of frequency carriers).

The object of the present invention is therefore to provide a transmission apparatus and method as well as a signal structure for a multi-carrier system, which allows a receiver to be flexibly tuned to any required part of the overall transmission bandwidth.

The above object is achieved by a transmitting apparatus. The transmitting apparatus according to the present invention is adapted to transmit signals in a multi-carrier system on the basis of a frame structure, each frame comprising at least two training patterns adjacent to each other in the frequency direction and at least two data patterns, whereby the transmitting apparatus comprises pilot mapping means adapted to map the same sequence of pilot signals on frequency carriers of each of said at least two training patterns in a frame, each training pattern having the same length, data mapping means adapted to map data on frequency carriers of said at least two data patterns in a frame, transforming means adapted to transform said training patterns and said data patterns from the frequency domain into the time domain in order to generate a time domain transmission signal, and transmitting means adapted to transmit said time domain transmission signal.

The above object is further achieved by a transmitting method. The transmitting method according to the present invention is adapted to transmit signals in a multi-carrier system on the basis of a frame structure, each frame comprising at least two training patterns adjacent to each other in the frequency direction and at least two data patterns, whereby the method comprises the steps of mapping the same sequence of pilot signals on frequency carriers of each of said at least two training patterns in a frame, each training pattern having the same length, mapping data on frequency carriers of said at least two data patterns in a frame, transforming said data patterns into the time domain in order to generate a time domain transmission signal and transmit said time domain transmission signal.

The above object is further achieved by a frame pattern. The frame pattern of the present invention is adapted for a multi-carrier system and comprises at least two training patterns adjacent to each other in the frequency direction and at least two data patterns, wherein the same sequence of pilot signals is mapped on frequency carriers of each of said at least two training patterns in the frame, each training pattern having the same length, and wherein data are mapped on frequency carriers of said at least two data patterns in the frame.

The object of the present invention is further to provide a receiving apparatus and method, as well as a system and a method for transmitting and receiving signals in a multi-carrier system, which allow a flexible tuning to any required part of the transmission bandwidth.

The above object is achieved by a receiving apparatus. The receiving apparatus according to the present invention is adapted to receive signals in a multi-carrier system on the basis of a frame structure in a transmission bandwidth, each frame comprising at least two training patterns adjacent to each other in the frequency direction each with the same sequence of pilot signals mapped on frequency carriers and at least two data patterns with data mapped on frequency carriers, each of said at least two training patterns having the same length, wherein said receiving apparatus comprises receiving means adapted to be tuned to and to receive a selected part of said transmission bandwidth, said selected part of said transmission bandwidth having at least the length of said training patterns and covering at least one data pattern to be received, and correlation means adapted to perform a correlation on the basis of the pilot signals received in said selected part of said transmission bandwidth.

The above object is further achieved by a receiving method. The receiving method of the present invention is adapted to receive signals transmitted in a multi-carrier system on the basis of a frame structure in a transmission bandwidth, each frame comprising at least two training patterns adjacent to each other in the frequency direction each with the same sequence of pilot signals mapped on frequency carriers and at least two data patterns with data mapped on frequency carriers, each of said at least two training patterns having the same length, whereby the method comprises the steps of receiving a selected part of said transmission bandwidth, said selected part of said transmission bandwidth having at least the length of one of said training patterns incorporating at least one data pattern to be received, and performing a correlation on the basis of the pilot signals received in said selected part of said transmission bandwidth.

The above object is further achieved by a system for transmitting and receiving signals, comprising a transmitting apparatus for transmitting signals in a multi carrier system on the basis of a frame structure, each frame comprising at least two training patterns adjacent to each other in the frequency direction and at least two data patterns, said transmitting apparatus comprising pilot mapping means adapted to map the same sequence of pilot signals on frequency carriers of each of said at least two training patterns in a frame, each training pattern having the same length, data mapping means adapted to map data on frequency carriers of said at least two data patterns in a frame, transforming means adapted to transform said training patterns and said data patterns from the frequency domain into the time domain in order to generate a time domain transmission signal, and transmitting means adapted to transmit said time domain transmission signal, said system further comprising a receiving apparatus according to the present invention adapted to receive said time domain transmission signal from said transmitting apparatus.

The above object is further achieved by a method for transmitting and receiving signals, comprising a transmitting method for transmitting signals in a multi carrier system on the basis of a frame structure, each frame comprising at least two training patterns adjacent to each other in the frequency direction and at least two data patterns, said transmitting method comprising the steps of
mapping the same sequence of pilot signals on frequency carriers of each of said at least two training patterns in a frame, each training pattern having the same length, mapping data on frequency carriers of said at least two data patterns in a frame, transforming said training patterns and said data patterns from the frequency domain into the time domain in order to generate a time domain transmission signal, and transmitting said time domain transmission signal,
said method further comprising a receiving method according to the present invention adapted to receive said time domain transmission signal.

The present invention therefore suggests a multi-carrier system which uses a frame structure or frame pattern in the frequency domain as well as in the time domain. In the frequency domain, each frame comprises at least two identical training patterns (which could also be called preamble patterns), which respectively carry the identical pilot signals on frequency carriers and respectively have the same length (or bandwidth). After a conversion into the time domain, in the resulting time domain signal, each frame then comprises a respective preamble (or training) symbol as well as data symbols. Each frame pattern covers the entire or overall transmission bandwidth in the frequency direction, so that the overall transmission bandwidth is therefore equally divided by the respectively identical training patterns. The data patterns of each frame then follow the training patterns in time. The receiving apparatus can be freely and flexibly tuned to any wanted part of the transmission bandwidth, provided that the part of the transmission bandwidth to which the receiving apparatus can be tuned has at least the length of one of the training patterns. Hereby, the receiving apparatus is always able to receive the pilot signals of an entire training pattern, so that a correlation of the received pilot signals in order to provide a time synchronisation, i.e. in order to define a synchronisation point or the start of a next frame, and/or a frequency offset calculation and/or a channel estimation is/are possible in the receiving apparatus.

Advantageously, the length of at least some of the data patterns is different from each other and the length of each of the data patterns is smaller than or equal to the length of each of the training patterns. Alternatively, the length of all the data patterns is the same and smaller than or equal to the length of each of the training patterns. Hereby, the receiving apparatus can be tuned to any wanted part of the transmission bandwidth in a flexible and non limited manner, whereby a correlation and thus a time synchronisation is always possible since the pilot signals of an entire training pattern can be received, so that the receiving apparatus can receive any wanted data pattern.

Further advantageously, the length of the data patterns in the transmitting apparatus is adjusted dynamically. The multi-carrier system with the frame structure as suggested by the present invention thus enables a very flexible transmission of data content in which the length of data patterns, and thus the amount of data per data pattern can be dynamically changed, for example from frame to frame or in any other required way. Alternatively, the length of the data patterns may be fixed or permanent.

Further advantageously, the at least two data patterns succeed said at least two training patterns in the time dimension, wherein each frame comprises additional data patterns succeeding said at least two data patterns in the time dimension, each of said additional data patterns having the respective same length as the corresponding one of said previous at least two data patterns. In other words, the structure of the data patterns in each frame is advantageously set up in a way that at least two data patterns are arranged next to each other in the frequency dimension so that the entire transmission bandwidth is covered. Additional data patterns are then arranged in the same frame but following the at least two data patterns in the time direction, whereby each additional or following data pattern has the same length (in the frequency dimension or direction) as the previous data pattern. Thus, if a receiving apparatus is tuned to a specific part of the transmission bandwidth, at least two data patterns per frame are received, each of said data patterns having the same length but following each other in the time dimension.

Further advantageously, each frame comprises at least two signalling patterns, whereby signalling data are mapped on frequency carriers of each signalling pattern in a frame. Each signalling pattern may hereby have the same length in the frequency dimension. For example, every signalling pattern in a frame may hereby have the identical signalling data mapped onto its frequency carriers. Alternatively, the signalling data of each signalling pattern in a frame may comprise the location of the signalling pattern in the frame, in which case every signalling pattern in a frame has the identical signalling data mapped onto its frequency carriers except the location information, which is different at least for some each signalling patterns in each frame. Thus, even though a receiving apparatus only receives a part of the entire transmission bandwidth, it is still possible to receive the entire signalling data. Hereby, it is further advantageous if the length of each signalling pattern is the same as the length of the training patterns and if the signalling patterns are aligned to the training patterns in the frequency direction. In specific applications, it may, however, be advantageous if the length of each signalling pattern is smaller than the length of each of said training patterns. Hereby, it may be particularly advantageous if the length of each signalling pattern is half the length of each of said training patterns.

Further advantageously, the signalling data are mapped on frequency carriers of each signalling pattern with an error detection and/or correction coding. Hereby, even if a receiving apparatus cannot receive an entire signalling pattern, the receiving apparatus may still be able to obtain the entire signalling information contained in the signalling pattern.

Advantageously, an auto-correlation is performed on the basis of the pilot signals received in the selected part of the transmission bandwidth. Although the receiver can be flexibly tuned to any wanted part of the transmission bandwidth, it is always possible to receive the pilot signals of an entire training pattern due to the new frame structure suggested by the present invention. Even if the selected part of the transmission bandwidth to which the receiver is tuned does not completely and correctly match with one of the training patterns (in the frequency direction), the receiver will in such cases receive the last part of a (frequency wise) preceding training pattern and the first part of a (frequency wise) succeeding training pattern. Since each of the training patterns is identical, the receiver is able to perform an auto-correlation in order to obtain the wanted time synchronisation without any problems even without any reordering or other processing of the received pilot signals. Alternatively, in case that the receiving apparatus knows its (frequency dimension) offset from the training pattern structure in each frame, it may be able to re-arrange the received pilot signals in the original sequence of pilot signals, in which case a cross-correlation can be performed by comparing a stored version of the training pattern with the received (re-arranged) version of the training pattern received in the selected part of the transmission bandwidth. In some applications, a cross-correlation may result in an even more accurate determination of the time synchronisation as compared to an auto-correlation.

Further advantageously, in case that each frame comprises at least two signalling patterns (in addition to the training and the data patterns), whereby each signalling pattern comprises signalling data mapped onto frequency carriers, the receiver of the present invention is adapted to reconstruct the original signalling pattern from the received selected part of the transmission bandwidth. Each signalling pattern may hereby have the same length in the frequency dimension. For example, every signalling pattern in a frame may hereby have the identical signalling data mapped onto its frequency carriers. Alternatively, the signalling data of each signalling pattern in a frame may comprise the location of the signalling pattern in the frame, in which case every signalling pattern in a frame has the identical signalling data mapped onto its frequency carriers except the location information, which is different at least for some each signalling patterns in each frame. For example, in case that the part of the transmission bandwidth to which the receiver is tuned does not match with the signalling pattern structure (in the frequency dimension), the receiver might know its offset from the original signalling pattern and would therefore be able to rearrange the received signalling signals and to bring them into the original sequence or order so that all necessary signalling data can be correctly identified and further used. Alternatively, the receiver may comprise the possibility to perform an error detection and/or correction decoding on the received signalling signals in order to reconstruct the original signalling pattern. Hereby, the transmitted signalling patterns may comprise additional error coding, redundancies or the like enabling the receiver to reconstruct the original signalling pattern even if only a part of the signalling pattern can be received.

Advantageously, the receiver is adapted to be tuned to and to receive a selected part of said transmission bandwidth so that an optimized receipt of a signalling pattern in the selected part of the transmission bandwidth is enabled. Particularly if the frequency dimension structure of the data patterns and the signalling patterns in a frame do not match, and if the selective part of the transmission bandwidth to be received in the receiver is larger (in frequency dimension) than the data pattern(s) to be received, it may be possible to optimize the tuning so that the best possible receipt of a signalling pattern is achieved, for example by adjusting the tuning so that the maximum part of one entire signalling pattern is received while still receiving the entire wanted data pattern(s).

Generally, it may be advantageous to tune the receiver so that the selective part of the transmission bandwidth is received so that at least one data pattern to be received is centered in relation to the selective part of the transmission bandwidth.

Further advantageously, the receiver can be tuned to receive a selective part of said transmission bandwidth on the basis of signalling information received in a signalling pattern of a previous frame.

It has to be understood that the present invention can be applied to any kind of multi-carrier system in which a transmitting apparatus is adapted to transmit data in an entire transmission bandwidth and a receiving apparatus is adapted to selectively receive only a part of said entire transmission bandwidth. Non limiting examples for such systems may be existing or future uni-directional or bi-directional broadcast systems, such as wired or wireless (for example cable based, terrestrial etc.) digital video broadcast systems. The non limiting example for a multi-carrier system would be an orthogonal frequency division multiplex (OFDM) system, however, any other suitable system could be used in which data, pilot signals and the like are mapped on a plurality of frequency carriers. The frequency carriers may hereby be equidistant and respectively have the same length (bandwidth). However, the present invention may also be used in multi-carrier systems in which the frequency carriers are not equidistant and/or do not have the respectively same length. Further, it should be understood that the present invention is not limited to any kind of specific frequency range neither in the overall transmission bandwidth applied on the transmitting side nor on the selected part of the transmission bandwidth to which the receiving side is tuned. However, in some applications it might be advantageous to use a receiving bandwidth on the receiving side, i.e. a bandwidth for the part of the transmission bandwidth to which the receiver can be tuned, which corresponds to the bandwidth of receiving devices of existing (digital video broadcast or other) systems. A non limiting example for a receiver bandwidth may be 8 MHz, i.e. the receiving side can be tuned to any wanted 8 MHz bandwidth from the overall transmission bandwidth. Hereby, the overall transmission bandwidth could be a multiple of 8 MHz, for example 8 MHz, 16 MHz, 24 MHz, 32 MHz etc, so that the segmentation of the overall transmission bandwidth, i.e. length of each training pattern could be 8 MHz. However, other segmentations are possible, e.g. (but not limited to) a length of each training pattern of 6 MHz.

Generally, in case of the non limiting example of 8 MHz for the receiver bandwidth, the length of each of the training patterns used in the frame structure of the present invention would be also 8 MHz (or less).

Figures 5A, 5B:
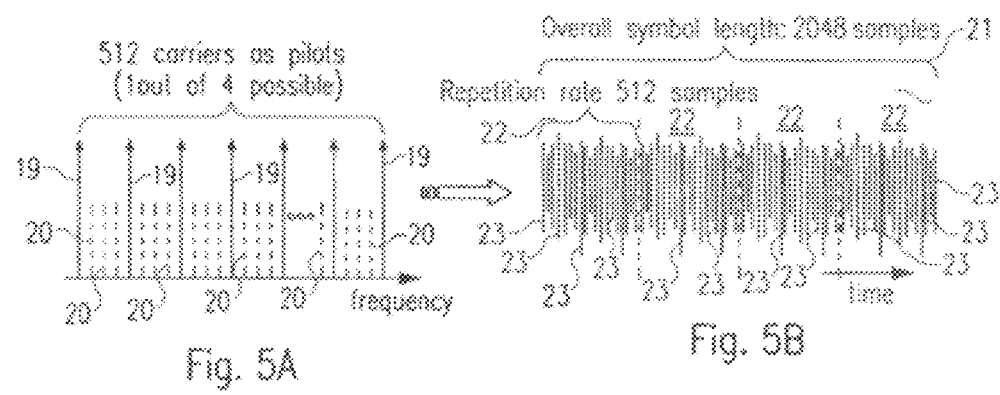
Figure 6:
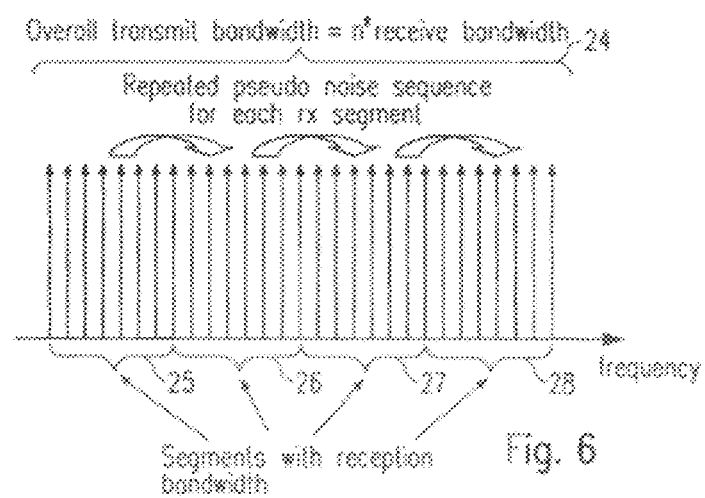

The present invention is explained in more detail in the following description of preferred embodiments in relation to the enclosed drawings, in which FIG. 1 shows a schematic diagram of an entire transmission bandwidth from which a selected part can be selectively and flexibly received by a receiver, FIG. 2 shows an example for a segmentation of the overall transmission bandwidth, FIG. 3 shows a schematic time domain representation of a frame structure according to the present invention, FIG. 4A shows a frequency domain example of a training pattern, FIG. 4B shows a time domain representation of the training pattern of FIG. 4A, FIG. 5A shows a frequency domain representation of a further example of a training pattern, FIG. 5B shows a time domain representation of the training pattern of FIG. 5A, FIG. 6 shows a schematic frequency domain representation of an overall transmission bandwidth with repetitive training patterns according to the present invention.

Figure 7:
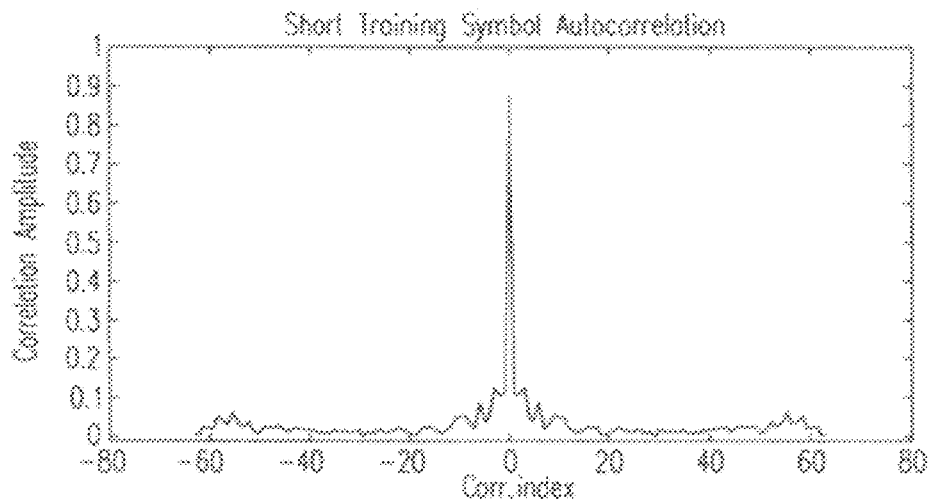
Figure 8:
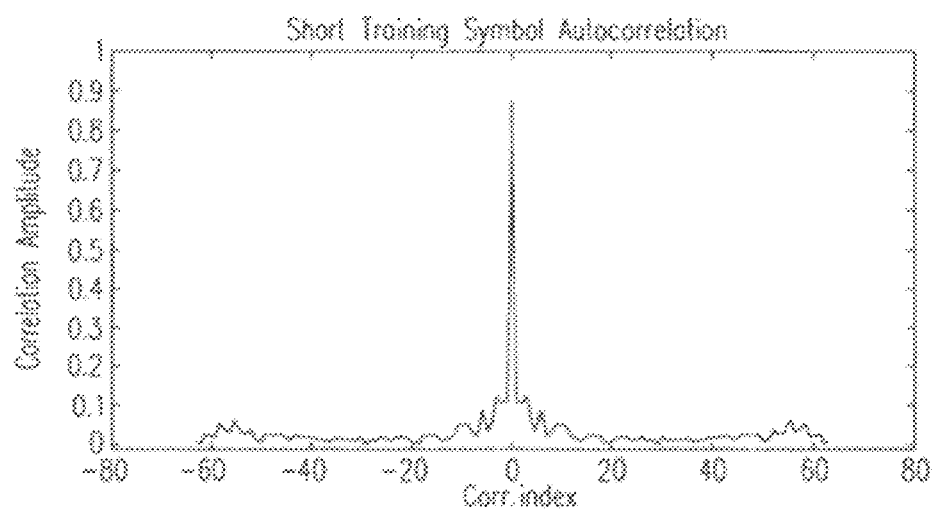
Figure 9:
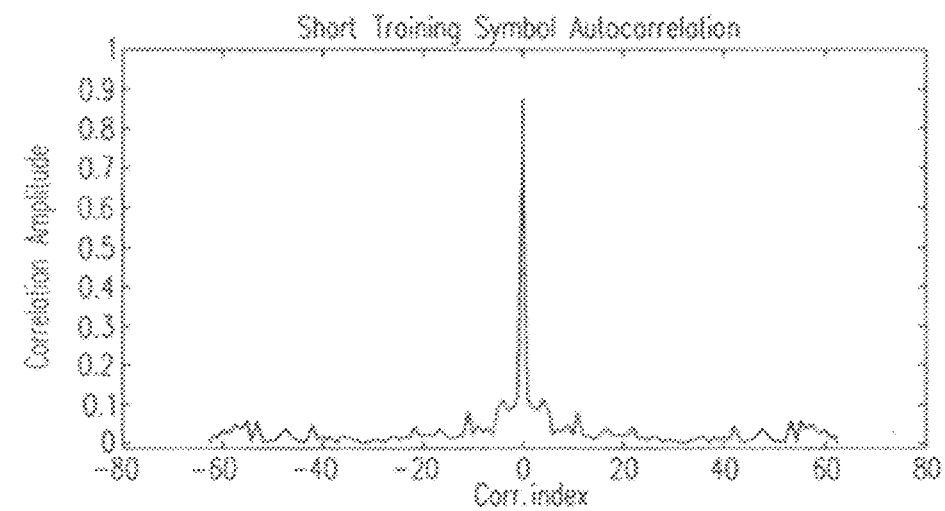
Figure 10:
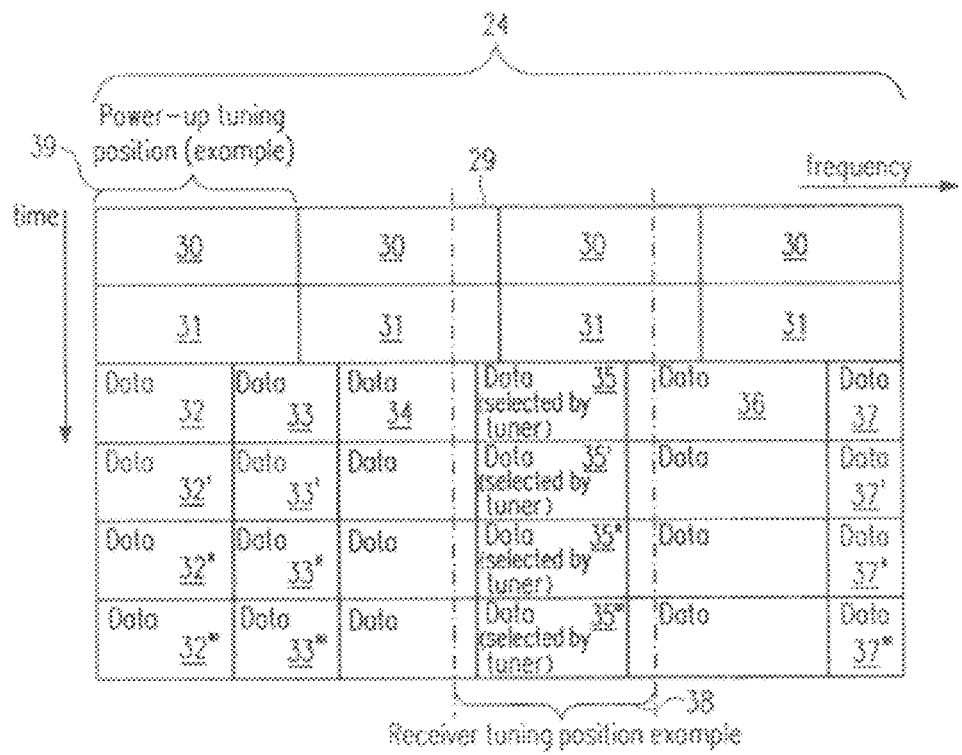
Figure 11:
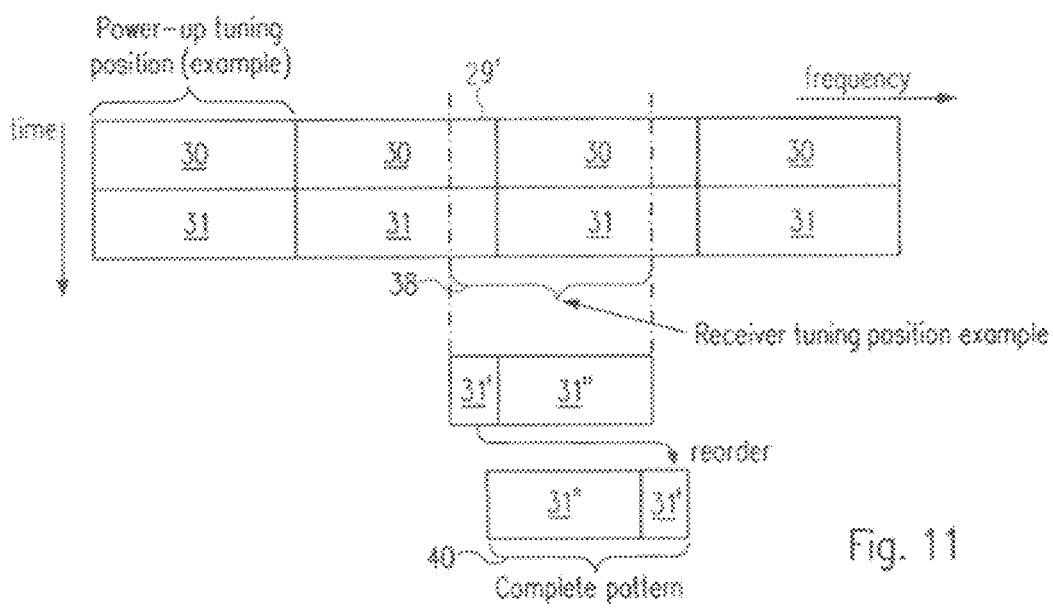
Figure 12:
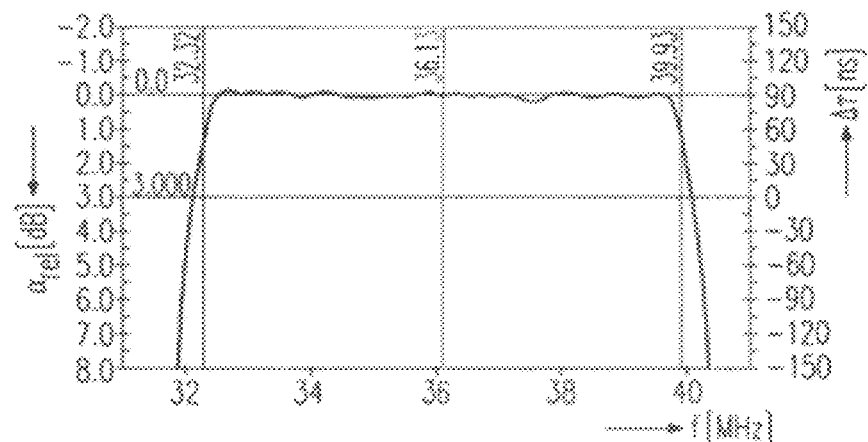
Figure 13:
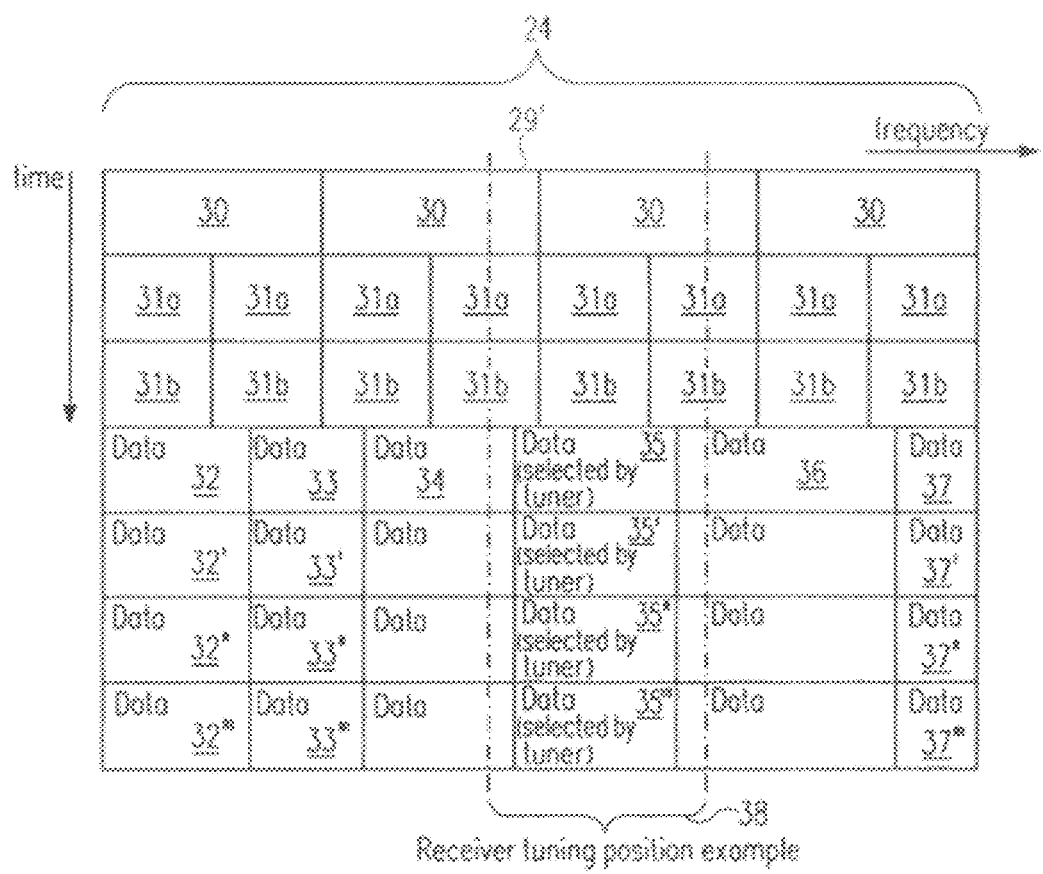
Figure 14:
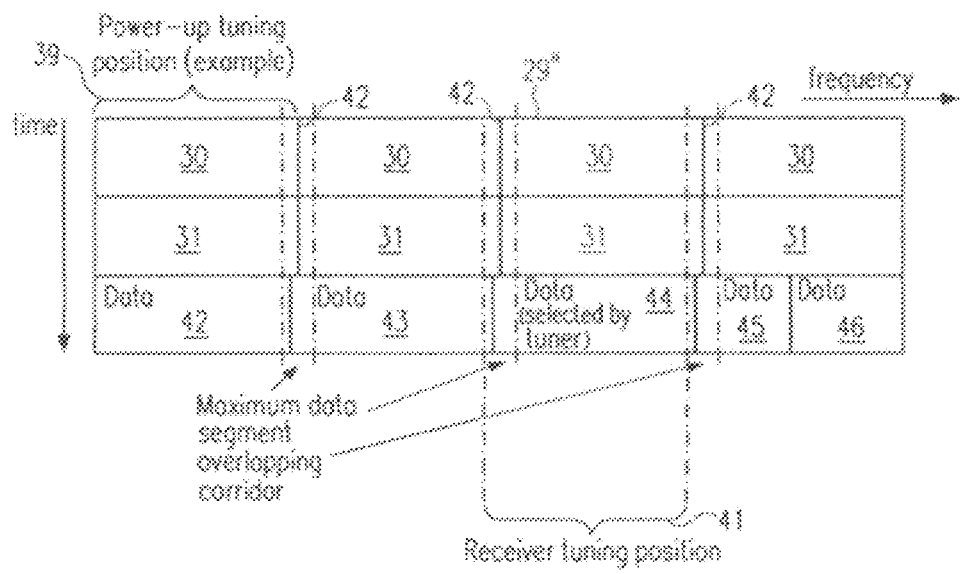
Figure 15:
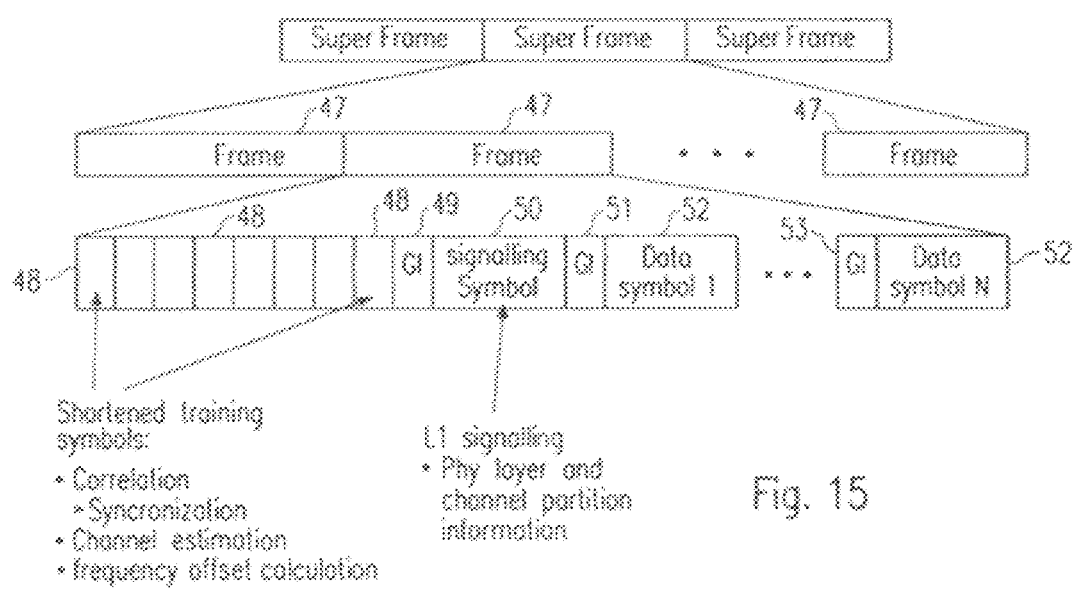
Figure 16:
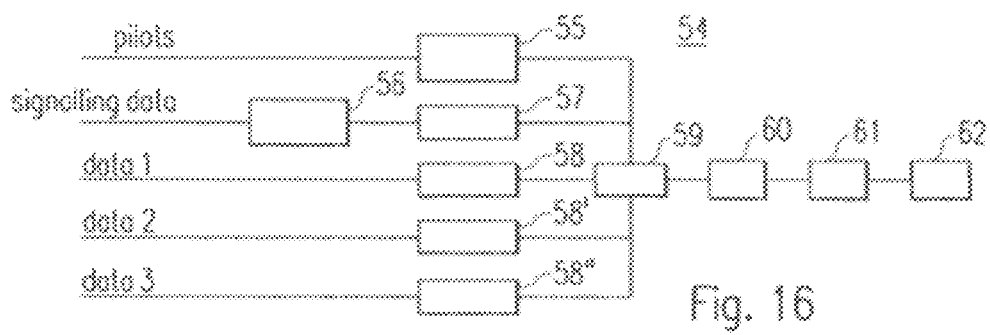
Figure 17:
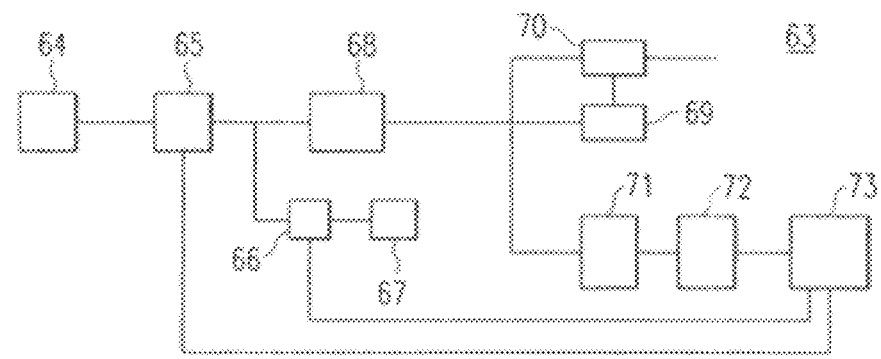

FIG. 7 shows a simulation result of an auto-correlation of multi-carrier system in which the transmission bandwidth is equal to the reception bandwidth, FIG. 8 shows a simulation result for an auto-correlation in which the receiving bandwidth coincides with a training pattern according to the present invention, FIG. 9 shows a simulation result of an auto-correlation in case that the receiving bandwidth does not coincide with a training pattern according to the present invention, FIG. 10 shows a schematic example of a frame structure or pattern according to the present invention, FIG. 11 shows a part of the frame structure of FIG. 10 with an explanation of a reconstruction of a signalling pattern, FIG. 12 shows a schematic example of a receiver filter characteristic, FIG. 13 shows a further example of a frame structure of a pattern according to the present invention, FIG. 14 shows a part of a further example of a frame structure or pattern according to the present invention, FIG. 15 schematically shows an example of a frame structure of the present invention in the time dimension, FIG. 16 shows a schematic block diagram of an example of a transmitting apparatus according to the present invention, and FIG. 17 shows a schematic block diagram of an example of a receiving apparatus according to the present invention FIG. 1 shows a schematic representation of an entire transmission bandwidth 1, in which a transmitting apparatus according to the present invention, as for example the transmitting apparatus 54 schematically shown in FIG. 16, transmits signals in a multi-carrier system in line with the present invention. FIG. 1 further schematically shows a block diagram of a receiving apparatus 3 of the present invention, which is adapted to be tuned to and selectively receive a selected part 2 of the transmission bandwidth 1. Hereby, the receiving apparatus 3 comprises a tuner 4 which is adapted to be tuned to and selectively receive the wanted part 2 of the transmission bandwidth 1 as well as further processing means 5 which perform the further necessary processing of the received signals in line with the respective communication system, such as a demodulation, channel decoding and the like. A more elaborate example of a receiving apparatus according to the present invention is shown in the schematic block diagram of FIG. 17, which shows a receiving apparatus 63 comprising a receiving interface 64, which can for example be an antenna, an antenna pattern, a wired or cable-based receiving interface or any other suitable interface adapted to receive signals in the respective transmission system or communication system. The receiving interface 64 of the receiving apparatus 63 is connected to a receiving means 65 which comprises a tuning means, such as the tuning means 4 shown in FIG. 1 as well as further necessary processing elements depending on the respective transmission or communication system, such as down conversion means adapted to down convert the received signal to an intermediate frequency or the base band.

As stated above, the present invention enables a flexible and changing reception of a wanted part 2 of the transmission bandwidth 1 in a receiver by providing a specific and new frame structure for a multi-carrier system. FIG. 2 shows a schematic representation of an overall transmission bandwidth 1, within which a transmitting apparatus 54 of the present invention is adapted to transmit data content, such as video data, audio data or any other kind of data, in different segments or parts 6, 7, 8, 9 and 10. For example, the parts 6, 7, 8, 9 and 10 could be used by the transmitting apparatus 54 to transmit different kinds of data, data from different sources, data intended for different recipients and so forth. The parts 6 and 9 have for example a maximum bandwidth, i.e. the maximum bandwidth which can be received by a corresponding receiving apparatus 63. The parts 7, 8 and 10 have smaller bandwidths. The present invention now suggests to apply a frame structure or pattern to the entire transmission bandwidth 1 whereby each frame comprises at least two training patterns adjacent to each other in the frequency direction and a number of data patterns. Each training pattern of a frame will have the same length and the identical pilot signals. In other words, the overall transmission bandwidth 1 is divided into equal parts for the training patterns, whereby the maximum bandwidth to which a receiver can be tuned, for example the bandwidth shown for parts 6 and 9 in FIG. 2, has to be equal or larger than the length of each training pattern. Hereby, by properly receiving an entire training pattern, a receiving apparatus 63 according to the present invention can correctly synchronize to the transmitting apparatus 54 and tune to and receive the wanted data in a flexible and non limiting way. Additionally, a frequency offset calculation and/or a channel estimation is/are possible in the receiving apparatus 63 on the basis of such a received training pattern. It is further clear that the length of the various data parts in the transmission bandwidth cannot exceed the length (number of frequency carriers) of the training patterns in the respective frame as will be explained in more detail further below.

FIG. 3 shows a schematic representation of a time domain structure of frames 11, 11', 11" according to the present invention. Each frame 11, 11', 11" comprises a preamble symbol (or training symbol) 12, 12', 12", one or more signalling symbols 13, 13' and several data symbols 14, 14". Hereby, in the time domain, the preamble symbols or training symbols are preceding the signalling symbols which are preceding the data symbols. Each frame 11, 11', 11" may have a plurality of data symbols, wherein systems are possible in which the number of data symbols in each frame 11, 11', 11" varies. The preamble symbols are used in a receiving apparatus 63 to perform time synchronisation and eventually additional tasks, such as channel estimation and/or frequency offset calculation. The signalling symbols 13, 13', contain signalling information, for example all physical layer information that is needed by the receiving apparatus 63 to decode the received signals, such as but not limited to L1 signalling data. The signalling data may for example comprise the allocation of data content to the various data patterns, i.e. for example which services, data streams, modulation, error correction settings etc. are located on which frequency carriers, so that the receiving apparatus 63 can obtain information to which part of the entire transmission bandwidth it shall be tuned. Further, the signalling symbols may contain signalling data indicating the offset of the respective data pattern from the preamble or training pattern and/or the signalling pattern so that the receiving apparatus 63 may optimize the tuning to the wanted part of the transmission frequency in a way that the receipt of the training patterns and/or the signalling patterns is optimized. The use of the frame structure according to the present invention has the further advantage that by dividing the data stream into logical blocks, changes of the frame structure can be signalled from frame to frame, whereby a preceding frame signals the changed frame structure of the or one of the succeeding frames. For example, the frame structure allows a seamless change of modulation parameters without creating errors.

FIGS. 4A, 4B, 5A and 5B show non limiting examples of preamble structures which could be used in the present invention. It has to be understood, however, that other possible preamble structures could also be used. FIG. 4A shows a frequency domain representation of a preamble or training pattern 15 in which a plurality of frequency carriers 16 (in the shown example 2048 carriers), respectively carry a pilot signal. In other words, all frequency carriers of the training pattern 15 carry a pilot signal. FIG. 4B shows the training pattern of FIG. 4A after the transformation in the time domain. The time domain training symbol comprises a plurality of time domain samples 17 (in the shown example 2048 samples) in a single repetition. In other words, the time domain training symbol does not have any repetitions in the time domain samples. FIG. 5A shows a further non limiting example of a frequency domain preamble pattern 18, comprising a plurality of frequency carriers (in the shown example 512 carriers). In the shown example, only every fourth sub-carrier carries a pilot signal 19, all other sub-carriers 20 do not carry pilot signals. After transformation into the time domain, the time domain preamble or the training symbol 21 shown in FIG. 5B shows four repetitions 22, each repetition 22 having the identical samples 23 (same value and number). In the shown example, the time domain training symbol has a length of 2048 time samples and each repetition 22 comprises 512 samples. The general rule is that the number of repetitions in the time domain corresponds to the repetition rate of the pilot signals in the frequency domain. In case that the distance of the pilot signals in the frequency domain is higher, the number of repetitions in the time domain increases. The repetitions in the time domain preamble or training symbol are sometimes called 'shortened' training symbols. In the example of FIG. 5B, the time domain symbol thus comprises four shortened training symbols. In some applications it may be advantageous to use pseudo noise pilot signal sequences in order to obtain pseudo noise like signal patterns in the time domain. Also, a so called CAZAC (constant amplitude zero auto correlation) sequence could be used for the pilot signals, or any other suitable sequence resulting in pseudo noise like signal patterns and having good correlation properties both in the frequency as well as in the time domain. Such sequences allow a time synchronisation in a receiving apparatus 63 of the present invention. In addition hereto, such sequences allow a reliable channel estimation in the receiving apparatus 63 in case that the Nyquist criterion is fulfilled in the frequency dimension. Further, such sequences allow a frequency offset calculation and/or a channel estimation in the receiving apparatus 63.

As mentioned above, the present invention suggests a frequency domain frame structure or frame pattern for the entire transmission bandwidth of the transmitting apparatus 54, in which identical training patterns are repeated over the entire transmission bandwidth, i.e. immediately adjacent to each other in the frequency direction. FIG. 6 visualizes schematically such a sequence of identical and adjacent training patterns 25, 26, 27, 28 in an entire transmission bandwidth 24. In other words, the same sequence of pilot signals is mapped onto the frequency carrier of each training pattern 25, 26, 27, 28, so that each training pattern has the same length (or bandwidth) and the same number of frequency carriers (assumed that the frequency sub-carriers are equidistant and respectively have the same length or bandwidth). Advantageously, as shown in FIG. 6, the overall transmission bandwidth 24 is equally divided into the training patterns 25, 26, 27, 28 having respectively the same length. The length of the training patterns 25, 26, 27 and 28 also corresponds to the minimum tuning bandwidth to which the receiving apparatus 63 of the present invention can be tuned in order to receive signals, in order to ensure that the receiving apparatus 63 is always able to receive an entire training pattern for synchronisation (and channel estimation, and/or frequency offset calculation).

The present invention therefore enables a receiving apparatus 63 to be tuned to any position within the overall channel bandwidth 24 in a very flexible manner while still being able to perform a reliable synchronisation by correlating the received pilot signals for example in a correlation means 67 of the transmitting apparatus 63 as shown in FIG. 17. Again, the invention suggests to divide the entire transmission frequency bandwidth 24 into adjacent sub-blocks or segments each having a training pattern containing a repetition of the identical pilot signal sequence and thus having the same length. The length of each of the training pattern thus corresponds advantageously to the bandwidth to which the receiving apparatus 63 can be tuned. For example, as shown in FIG. 17, the receiving apparatus 63 comprises a receiving interface 64, such as an antenna, a wired receiving interface or the like, to which signals are received in a receiving means 65, which comprises a tuner. If the receiving apparatus 63 is tuned to a part of the transmission bandwidth which matches or coincides to one of the training patterns, the pilot signal sequence is received in the original order. If the receiving apparatus 63 is tuned to an arbitrary part of the transmission bandwidth or for example between two training patterns, still all pilot signals of the training pattern are received, however, not in the original sequence. However, due to the cyclic behaviour of the pilot sequence sequences, very good correlation properties are still present particularly if pseudo noise sequences are used for the pilot signals in each training pattern and the correlation means 67 of the receiving apparatus 63 of the present invention still delivers good results when performing an auto-correlation i.e. a correlation of the received pilot signals with themselves. Specifically, in wired systems, such as cable systems, auto-correlation is expected to deliver good results because of the high signal to noise ratio. Also, such sequences enable a frequency offset calculation and/or a channel estimation in the receiving apparatus 63.

FIG. 7 shows an example of a simulation result for 64 sample pseudo noise sequence for a multi-carrier system without segmentation of the training pattern, i.e. in which the transmission bandwidth is identical to the receiving bandwidth. The correlation peak is clearly visible. FIG. 8 shows a further example of a simulation result for a system according to the present invention, in which the entire transmission bandwidth comprises identical training patterns and the receiver is tuned to a part of the transmission bandwidth. In the simulation shown in FIG. 8, the receiver was tuned and identically matched to the first segment, i.e. the first training pattern of the entire transmission bandwidth. In other words, the simulation shows an auto-correlation result for the situation in which the receiver receives the pilot signals of a training pattern in the original sequence. Again, the correlation peak is clearly visible. FIG. 9 now shows a simulation result for the system of FIG. 8, whereby the receiver was tuned to a position between two training patterns so that the receiver did not receive the pilot signals in the original sequence, but received the last part of a preceding training pattern before the first part of the succeeding training pattern. However, due to the cyclic behaviour of the pilot sequences and the training patterns, it is still possible to obtain an auto-correlation peak, which is shown in FIG. 9.

In case that the receiving apparatus 63 knows its tuning position, i.e. knows the offset from the start of a frame or from the respective start of each training pattern, an optionally provided rearranging means 66 could rearrange the received pilot signals into the original sequence and to perform a cross-correlation on the basis of a comparison with a stored version of the expected training pattern in order to obtain a cross-correlation result. Such a cross-correlation result will normally have a better quality then an auto-correlation result since it is less effected by noise. Thus, for systems with low signal to noise ratios, cross correlation would be the better choice.

FIG. 10 shows a schematic example of a frequency domain representation of a frame structure or pattern 29 according to the present invention. The frame structure 29 covers the entire transmission bandwidth 24 in the frequency direction and comprises at least two training patterns 30 adjacent to each other in the frequency direction, each carrying the identical sequence of pilot signals on respective frequency carriers and having the same length. In the example shown in FIG. 4, the entire transmission bandwidth 24 is sub-divided into four training patterns 30, but any other higher or lower number of training patterns might be suitable. In the transmitting apparatus 54 of the present invention as shown in FIG. 16, a pilot mapping means 55 is adapted to map the pilot signals onto the frequency carriers of each training pattern. Advantageously, a pseudo noise sequence or a CAZAC sequence is used for the pilot signals, but any other sequence with good pseudo noise and/or correlation properties might be suitable. Also, the pilot mapping means 55 may be adapted to map a pilot signal onto every frequency carrier in the training patterns, as explained in relation to FIG. 4. Alternatively, the pilot mapping means 55 might be adapted to map a pilot signal onto every m-th frequency carrier (m being a natural number larger than 1) as for example explained in relation to FIG. 5. The length or bandwidth 39 of every training pattern 30 is the same as the bandwidth 38 to which the tuner of the receiving apparatus 63 can be tuned. However, the part of the transmission bandwidth to which the tuner of the receiving apparatus 63 can be tuned, may be larger than the length of a training pattern 30. Besides for the correlation performed in the correlation means 67 in the receiving apparatus 63, the received pilots can further (after transformation into the frequency domain in the transformation means 68) be used for a channel estimation for the frequency carriers in the frame in a channel estimation means 69, which provides a de-mapping means 70 with the necessary channel estimation information enabling a correct de-mapping of the data in the received data signals. Also, the received pilots can be used in the receiving apparatus 63 for a frequency offset calculation in a corresponding means which is not shown in FIG. 17.

The frame structure or pattern 29 further comprises at least two signalling patterns 31 adjacent to each other in the frequency direction which follow the training patterns 30 in the time direction. Each signalling pattern 31 has the same length and bandwidth as the respectively preceding training pattern 30, and the beginning and the end of each signalling pattern 31 in the frequency direction are identical to the beginning and the end of the respective (time wise) preceding training pattern 30, so that the frequency structure of the signalling patterns 31 is identical to the frequency structure of the training patterns 30. In other words, the signalling patterns 31 are aligned to the training patterns 30. The transmitting apparatus 54 of the present invention shown in FIG. 16 comprises a signalling data mapping means 57 which is adapted to map signalling data onto the frequency carriers of each signalling pattern 31. Hereby, each signalling pattern 31 comprises for example the location of the signalling pattern 31 within the frame. For example each signalling pattern 31 in each frame has and carries the identical signalling data, except the location of the respective signalling pattern in the frame, which is different in each signalling pattern 31 in a frame. The signalling data are for example L1 signalling data which contain all physical layer information that is needed by the receiving apparatus 63 to decode received signals. However, any other suitable signalling data may be comprised in the signalling patterns 31. The signalling patterns 31 might for example comprise the location of the respective data segments 32, 33, 34, 35, 36 so that a receiving apparatus 63 knows where the wanted data segments are located so that the tuner of the receiving apparatus 63 can tune to the respective location in order to receive the wanted data segments. As shown in FIG. 17, the receiving apparatus 63, after the receiving means 65 with the tuner, comprises a transformation means 68 for transforming the received time domain signals into the frequency domain, where after the signalling data (after an optional reconstruction in a reconstruction means 71), are de-mapped in a de-mapping means 72 and then evaluated in an evaluation means 73. The evaluation means 73 is adapted to extract the necessary and required signalling information from the received signalling data. If necessary, additional signalling patterns could be provided in the time direction immediately succeeding the signalling patterns 31.

The frame structure or pattern 29 further comprises at least two data segments extending over the entire frequency bandwidth 24 in the frequency direction and following the signalling patterns 31 in the time direction. In the time slot immediately following the time slot in which the signalling patterns 31 are located, the frame structure 29 shows several data segments 32, 33, 34, 35, 36 and 37 with different lengths, i.e. a different number of respective frequency carriers onto which data are mapped. The frame structure 29 further comprises additional data segments in succeeding time slots, whereby the additional data patterns respectively have the same length and number of frequency carriers as the respectively preceding data pattern. For example, the data pattern 32', 32" and 32''' have the same length as the first data pattern 32. The data patterns 33', 33" and 33''' have the same length as the data segment 33. In other words, the additional data patterns have the same frequency dimension structure as the several data patterns 32, 33, 34, 35, 36 and 37 in the first time slot after the signalling patterns 31. Thus, if the receiving apparatus 63 for example tunes to a part 38 of the transmission bandwidth in order to receive the data pattern 35, all time wise succeeding data patterns 35', 35" and 35''' which have the same length as the data pattern 35 can be properly received.

The flexible and variable data pattern structure of the frame structure or pattern 29 as suggested by the present invention can for example be implemented in the transmitting apparatus 54 of the present invention as shown in FIG. 16 by mapping of various different data streams, for example with different kinds of data and/or data from different sources, as visualized by the branches data 1, data 2 and data 3 in FIG. 16. The respective data are then mapped onto frequency carriers in respective data patterns by the respective data mapping means 58, 58' and 58". As stated, at least some of the various data patterns may have different lengths, i.e. different numbers of frequency carriers in case that the frequency carriers are equidistant and have the same bandwidth, respectively. Alternatively, the number of data patterns in the frequency direction may be the same as the number of training patterns, wherein the length (or bandwidth) of each data patterns may be identical to the length of each training patterns and they may be aligned to each other (have the same frequency direction structure). Alternatively, each data pattern might have the same length and the number of the data patterns might be a multiple of the number of training patterns, while still having the same frequency structure and alignment. Thus for example, 2, 3, 4 or more data patterns would be aligned to each of the training patterns. Generally, the length of the data patterns needs to be smaller or at maximum equal to the effective receiver bandwidth so that the data patterns can be received in the receiving apparatus 63. Further, the transmitting apparatus 54 may be adapted to change the data pattern structure, e.g. the length and/or the number of the data patterns dynamically. Alternatively, the structure of the data patterns could be fixed or permanent.

Further, it is to be noted that the data patterns could advantageously comprise pilot signals mapped on some of the frequency carriers in order to enable a fine channel estimation on the receiving side. Hereby, the pilot signal could be scattered among the carriers with the data in a regular or an irregular pattern depending.

In the transmitting apparatus 54, the frequency carriers with the pilots from the pilot mapping means 55, the frequency carriers with the signalling data from the signalling mapping means 57 and the frequency carriers with the data from the various data mapping means 58, 58', 58" are then combined to a frame pattern or structure 29 according to the present invention in a frame forming means 59.

Generally, the frame structure of the present invention could be fixed or permanent, i.e. the overall bandwidth as well as the extension of each frame in the time direction could be fixed and always the same. Alternatively, the frame structure can also be flexible, i.e. the overall bandwidth and/or the extension of each frame in the time direction could be flexible and changed from time to time depending on the desired application. For example, the number of time slots with data patterns could be flexibly changed. Hereby, the changes could be signalled to a receiving apparatus in the signalling data of the signalling patterns.

It can be seen in FIG. 10, that the part 38 to which the receiving apparatus 63 is tuned, does not match with the frequency structure of the training patterns 30 and signalling patterns 31. However, is explained above, due to the cyclic nature of the pilot signal sequences in the training patterns 30, the correlation means 67 of the receiving apparatus 63 is still able to perform an auto-(or cross-)correlation. Further, in this situation shown in FIG. 10, the receiving apparatus 63 needs knowledge about the offset of the part 38 in relation to the frequency structure of the frame pattern 29 in order to be able to re-arrange the receive signalling carriers into the original signalling sequence of the signalling patterns 31 which is done in a reconstruction means 71. This is due to the fact that the signalling patterns 31 have the same length and frequency structure as the training patterns 30.

During the start-up phase or initialization phase of the receiving apparatus 63, the receiving apparatus 63 may tune to an arbitrary frequency part of the overall transmission bandwidth. In the non-limiting example of a cable broadcast system, the training pattern 30 could for example have a 8 MHz bandwidth. Thus, during the start-up phase, the receiving apparatus 63 is able to receive an entire training pattern 30 in the original or re-ordered sequence as well as an entire signalling pattern 31 in the original or re-ordered sequence from the received training pattern 30. The receiving apparatus 63 is able to perform a correlation in the correlation means 67 in order to obtain a time synchronisation, as well as perform a channel estimation (usually a coarse channel estimation) in a channel estimation means 69 and/or a frequency offset calculation after a transformation of the received time domain signals into the frequency domain in the transformation means 68. In the evaluation means 73 of the receiving apparatus 63, the received signalling data are evaluated, for example the location of the received signalling pattern in the frame is obtained so that the receiver can freely and flexibly tune to the respectively wanted frequency position, such as the part 38 is shown in FIG. 10. In the new tuning position, which will usually not necessarily match with the frequency structure of the training patterns 30 and the signalling patterns 31, the receiving apparatus 63 is still able to perform synchronisation, channel estimation and frequency offset calculation on the basis of the pilot signals of the training patterns 30 due to their cyclic nature. However, in order to be able to properly evaluate the signalling data of the signalling patterns 31, the received signalling signals have to be re-ordered which is performed in a reconstructing means 71 as described. FIG. 11 shows this reordering in a schematic example. The last part 31' of a previous signalling pattern is received before the first part 31" of a succeeding signalling pattern, where after the reconstructions means 71 places the part 31' after the part 31" in order to reconstruct the original sequence of the signalling data, where after the reordered signalling pattern is evaluated in the evaluation means 73 after a corresponding de-mapping of the signalling data from the frequency carriers in the de-mapping means 72. It is to be remembered that the content of each signalling pattern 31 is the same, so that this reordering is possible.

Often, a receiving apparatus does not provide a flat frequency response over the complete receiving bandwidth to which the receiver is tuned. In addition, a transmission system usually faces increasing attenuation at the boarder of the receiving bandwidth window. FIG. 12 shows a schematic representation of a typical filter shape example. It can be seen that the filter is not rectangular, so that e.g. instead of 8 MHz bandwidth, the receiving apparatus is only able to effectively receive 7.4 MHz bandwidth. The consequence is that the receiving apparatus 63 may not be able to perform the reordering of the signalling data as described in relation to FIG. 11 in case that the signalling patterns 31 have the same length and bandwidth as the receiving bandwidth of the receiving apparatus 63, so that some signals are lost and cannot be received at the border of the receiving bandwidth. In order to overcome this problem, and other problems and in order to ensure that the receiving apparatus 63 is always able to receive one complete signalling patterns in the original sequence and does not have to reorder or rearrange the received signalling signals, the present invention alternatively or additionally suggests to use signalling patterns 31a which have a reduced length as compared to the training patterns 30. The example shown in FIG. 13, it is suggested to use signalling patterns 31a which have exactly half the length of a training pattern 30, but still the same frequency structure as the training patterns 30. In other words, respective two (i.e. pairs) of the half length signalling patterns 31a are matched and aligned with each one of the training patterns 30 as shown in FIG. 13. Hereby, each pair of signalling patterns 31a would have the identical signalling data including the location of the signalling patterns 31a in the respective frame. However, in relation to the other pairs of signalling patterns, in these other pairs, since they have a respective different location within the frame, the signalling data would be identical except the location information. Hereby, in order to ensure that the same amount of signalling data as before can be transmitted, it might be necessary to add additional half length signalling patterns 31b in the time slot succeeding the signalling patterns 31a and before the data patterns 32, 34, 35, 36 and 37. The additional signalling patterns 31b have the same time and frequency arrangement/alignment as the signalling patterns 31a, but comprise additional and different signalling information as the signalling information contained in the signalling patterns 31a. In this way, the receiving apparatus 63 will be able to receive the signalling patterns 31a and 31b completely and in the original sequence so that a reconstruction or reordering is not necessary. In this case, the reconstruction means 71 in the receiving apparatus 63 can be omitted. It is also possible to only provide one time slot with half length signalling patterns 31a if all necessary signalling data can be transmitted in the half length and the additional signalling patterns 31b are not necessary. Alternatively, even more half length signalling patterns could be used in the succeeding time slot after the signalling patterns 31b.

It should be generally (for all embodiments of the present invention) noted that the length (or bandwidth) of the training patterns, the data patterns and/or the signalling patterns could be adapted to, e.g. could be smaller than or at maximum equal to, the effective receiving bandwidth of the receiving apparatus 63, for example the output bandwidth of the receiving band pass filter, as described above.

Further, it should be generally noted that the training patterns, the signalling patterns and/or the data patterns of the frame structure described by the present invention could comprise additional guard bands, i.e. unused carriers at the beginning and/or the end of the respective pattern or frame. For example, each training pattern could comprise a guard band at the beginning and the end of each pattern. Alternatively, in some applications it might be advantageous if only the first training pattern in each frame, in the example of FIG. 10 the training pattern at position 39, could comprise a guard band only at the beginning of the pattern, and the last training pattern in each frame could comprise a guard band only at the end of the pattern. Alternatively, in some applications only the first training pattern in each frame, in the example of FIG. 10 the training pattern at position 39, could comprise a guard band at the beginning as well as at the end of the pattern, and the last training pattern in each frame could comprise a guard band at the beginning as well as at end of the pattern. The length of the guard band comprised in some or all of the training patterns could for example be smaller or at maximum equal to the maximum frequency offset the receiving apparatus can cope with. In the mentioned example of a bandwidth of 8 MHz for each training pattern, the guard band could for example have a length of 250 to 500 kHz or any other suitable length. Also, the length of each of the guard bands comprised in the training patterns could be at least the length of the carriers which are not received in the receiving apparatus due to the filter characteristics as described in relation to FIG. 12. Also, in case that the signalling patterns have guard bands, the length of each of the guard bands comprised in the training patterns could be at least the length of each of the signalling pattern guard bands.

Additionally or alternatively, each signalling pattern could comprise a guard band with unused carriers at the beginning and the end of each pattern. Hereby, the length of each of the guard bands comprised in the signalling patterns could be at least the length of the carriers which are not received in the receiving apparatus due to the filter characteristics as described in relation to FIG. 12, so that the length of the signalling data in each signalling pattern is equal to (or may be smaller than) the effective receiver bandwidth.

Additionally or alternatively, each data pattern could comprise a guard band with unused carriers at the beginning and the end of each pattern. Hereby, the length of the guard bands could for example be the same as the length of the guard bands of the signalling patterns if the signalling patterns comprise guard bands. Alternatively, in some applications only the respective first data patterns in each frame in the frequency direction, in the example of FIGS. 10 and 13 the data patterns 32, 32', 32", 32'" could comprise a guard band only at the beginning of the data pattern, and the last data patterns in each frame in the frequency direction, in the example of FIGS. 10 and 13 the data patterns 37, 37', 37", 37'" could comprise a guard band at the end of the data pattern. Hereby, the length of the guard bands of the data carriers could be the same as (or could be different from) the length of the guard bands of the signalling patterns.

Alternatively or additionally, in order to overcome the problem that parts of the signalling patterns 31 may not be receivable in the receiving apparatus 63, the transmitting apparatus 54 could optionally comprise an error coding means 56 adapted to add some kind of error coding, redundancy, such as repetition coding, or the like to the signalling data which are mapped onto the frequency carriers of a signalling pattern by the signalling mapping means 57. The additional error coding would enable the transmitting apparatus 54 to use signalling patterns 31 in the same length as the training patterns 30, as shown in FIG. 10, since the receiving apparatus 63 is able, for example, by means of the reconstructing means 71, to perform some kind of error detection and/or correction in order to reconstruct the original signalling pattern.

In order to ensure a even better reception of the signalling patterns and the receiving apparatus 63, the present invention further suggests to optimize the tuning position of the receiving apparatus 63. In the examples shown in FIGS. 10 and 13, the receiver is tuned to a part 38 of the transmission bandwidth by centering the part 38 around the frequency bandwidth of the data patterns to be received. Alternatively, the receiving apparatus 63 could be tuned so that the reception of the signalling pattern 31 is optimized by placing the part 38 so that a maximum part of a signalling pattern 31 is received while the wanted data pattern is still fully received. Alternatively, the present invention suggests that the length of the respective data patterns should not be different from the length of the respective preamble patterns 30 and signalling patterns 31 by more than a certain percentage for example 10%. An example for this solution can be found in FIG. 14. The borders between the data patterns 42, 43, 44 and 45 are (in the frequency direction) not deviating from the borders between preamble patterns 30 and the signalling patterns 31 by more than a certain percentage, such as (but not limited to) 10%. This small percentage can then be corrected by the above-mentioned additional error coding in the signalling patterns 31.

FIG. 15 shows a time domain representation of an example of frame 47 according to the present invention. In the transmitting apparatus 54, after the frame pattern or structure was generated in the frame forming means 59, the frequency domain frame pattern is transformed into the time domain by a transformation means 60. An example of a resulting time domain frame is now shown in FIG. 15. The frame 47 comprises a number of shortened training symbols 48, resulting from a mapping of pilot signals only onto every m-th frequency carrier (m being a natural number larger or equal than 2) by a pilot mapping means 55, followed by a guard interval 49, a signalling symbol 50, a further guard interval 51 and a number of data symbols 52, which are respectively separated by guard intervals 53. In case of the presence of respective two signalling patterns 31a, 31b as explained in relation to FIG. 13, the frame 47 would comprise two signalling symbols separated by a guard interval. The guard intervals could e.g. be cyclic extensions of the useful parts of the respective symbols. The synchronization reliability could be generally enhanced by inverting the last training symbol, i.e. by inverting the phase of the last training symbol in respect to the preceding training symbols (which have all the same phase). The time domain frames are then forwarded to a transmission means 61 which processes the time domain signal depending on the used multi-carrier system, for example by up-converting the signal to the wanted transmission frequency. The transmission signals are then transmitted via a transmission interface 62, which can be a wired interface or a wireless interface, such as an antenna or the like.

The number of shortened training symbols 48 in frame 47 is depending on the wanted implementation and the used transmission system. As a non-limiting example, the number of shortened training symbols 48 could be 8, which is a good compromise between correlation complexity and synchronization reliability.

FIG. 15 further shows that a respective number of frames could be combined to super frames. The number of frames per super frame, i.e. the length of each super frame in the time direction, could be fixed or could vary. Hereby, there might be a maximum length up to which the super frames could be set dynamically. Further, it might be advantageous if the signalling data in the signalling patterns for each frame in a super frame are the same and if changes in the signalling data only occur from super frame to super frame. In other words, the modulation, coding, number of data patterns etc. would be the same in each frame of a super frame, but could then be different in the succeeding super frame. For example, the length of the super frames in broadcast systems could be longer since the signalling data might not change as often, and in interactive system the super frame length could be shorter since an optimization of the transmission and reception parameters could be done on the basis of feedback from the receiver to the transmitter.

The elements and functionalities of the transmitting apparatus 54, a block diagram of which is shown in FIG. 16, have been explained before. It has to be understood, that an actual implementation of a transmitting apparatus 54 will contain additional elements and functionalities necessary for the actual operation of the transmitting apparatus in the respective system. In FIG. 16, only the elements and means necessary for the explanation and understanding of the present invention are shown. The same is true for the receiving apparatus 63, a block diagram of which is shown in FIG. 17. FIG. 17 only shows elements and functionalities necessary for the understanding of the present invention. Additional elements will be necessary for an actual operation of the receiving apparatus 63. It has to be further understood that the elements and functionalities of the transmitting apparatus 54 as well as the receiving apparatus 63 can be implemented in any kind of device, apparatus, system and so forth adapted to perform the functionalities described and claimed by the present invention.

The present invention is further directed to a frame structure (and a correspondingly adapted transmitting and receiving apparatus and method as described above), which, as an alternative to the above described embodiments, does have a number (two or more) data patterns in which at least one data pattern has a length which is different from the length of the other data pattern(s). This structure of data patterns with a variable length can be combined either with a sequence of training patterns with identical lengths and contents as described above, or with a sequence of training patterns in which at least one training pattern has a length and/or a content different from the other training patterns, i.e. a variable training pattern length. In both cases, the receiving apparatus 63 will need some information about the varying data pattern length, which could be transmitted by means of a separate signalling data channel or by means of signalling data comprised in signalling data patterns comprised in the frame structure as described above. In the later case, it might be a possible implementation if the first training pattern and the first signalling pattern in each frame always have the same length so that the receiving apparatus can always obtain the information about the varying data patterns by receiving the first training patterns and signalling patterns in every or the necessary frames. Of course, other implementations might be possible. Otherwise, the rest of the above description in relation to the training patterns, the data patterns and the signalling patterns as well as the possible implementations in the transmitting apparatus 54 and the receiving apparatus 63 is still applicable.

The invention claimed is:

1. A transmitting apparatus for transmitting signals in a multi-carrier system on the basis of a frame structure, said transmitting apparatus comprising:
    a frame former configured to form frames of said frame structure, each frame comprising at least two preamble patterns adjacent to each other in the frequency direction and at least two data patterns following the at least two preamble patterns in the time direction, wherein all data patterns following each other in the time direction have a same frequency direction structure, each of the at least two preamble patterns and the at least two data patterns comprising a plurality of frequency carriers, wherein a length of each of the at least two preamble patterns is equal to or smaller than the effective receiving bandwidth of a receiving apparatus configured to receive said signals,
    a pilot mapper configured to map pilot signals on frequency carriers of each of said at least two preamble patterns in a frame, each preamble pattern having a same length,
    a data mapper configured to map data on frequency carriers of said at least two data patterns in a frame,
    a transformer configured to transform said at least two preamble patterns and said at least two data patterns from the frequency domain into the time domain in order to generate a time domain transmission signal, and
    a transmitter configured to transmit said time domain transmission signal.

2. The transmitting apparatus according to claim 1, wherein a length of at least some of the at least two data patterns is different from each other, and the length of each of the at least two data patterns is smaller than or equal to the length of each of the at least two preamble patterns.

3. The transmitting apparatus according to claim 1, wherein a length of all the at least two data patterns is smaller than or equal to the length of each of the at least two preamble patterns.

4. The transmitting apparatus according to claim 1, wherein the length of the at least two data patterns is adjusted dynamically.

5. The transmitting apparatus according to claim 1, wherein each frame comprises at least two signaling patterns, said transmitting apparatus further comprising a signaling data mapper configured to map the same signaling data on frequency carriers of each signaling pattern in a frame.

6. The transmitting apparatus according to claim 5, wherein a length of each signaling pattern is the same as the length of said at least two preamble patterns.

7. The transmitting apparatus according to claim 5, wherein a length of each signaling pattern is smaller than the length of each of said at least two preamble patterns.

8. The transmitting apparatus according to claim 7, wherein the length of each signaling pattern is half the length of each of said at least two preamble patterns.

9. The transmitting apparatus according to claim 5, wherein the signaling data mapper is configured to map the signaling data on frequency carriers of each signaling pattern of the at least two signaling patterns with an error correction coding.

10. A transmitting method for transmitting signals in a multi-carrier system on the basis of a frame structure, the method comprising:

forming frames of said frame structure, each frame comprising at least two preamble patterns adjacent to each other in the frequency direction and at least two data patterns following the at least two preamble patterns, wherein all data patterns following each other in the time direction have a same frequency direction structure, each of the at least two preamble patterns and the at least two data patterns comprising a plurality of frequency carriers, wherein a length of each of the at least two preamble patterns is equal to or smaller than the effective receiving bandwidth of a receiving apparatus configured to receive said signals, mapping pilot signals on frequency carriers of each of said at least two preamble patterns in a frame, each preamble pattern having a same length, mapping data on frequency carriers of said at least two data patterns in a frame, transforming said at least two preamble patterns and said at least two data patterns from the frequency domain into the time domain in order to generate a time domain transmission signal, and transmitting said time domain transmission signal.

11. A receiving apparatus for receiving signals in a multi-carrier system on the basis of a frame structure in a transmission bandwidth, each frame comprising at least two preamble patterns adjacent to each other in the frequency direction, each with pilot signals mapped on frequency carriers and at least two data patterns following the at least two preamble patterns in the time direction, wherein all data patterns following each other in the time direction have a same frequency direction structure, said at least two data patterns having data mapped on frequency carriers, each of said at least two preamble patterns having a same length, each of the at least two preamble patterns and the at least two data patterns comprising a plurality of frequency carriers, said receiving apparatus comprising:

a receiver configured to be tuned to and to receive a selected part of said transmission bandwidth, said selected part of said transmission bandwidth having at least a length of one of said at least two preamble patterns and covering at least one data pattern to be received, and a correlator configured to perform a correlation on the basis of the pilot signals received in said selected part of said transmission bandwidth.

12. The receiving apparatus according to claim 11, wherein said correlator is configured to perform an auto-correlation on the basis of the pilot signals received in said selected part of said transmission bandwidth.

13. The receiving apparatus according to claim 11, wherein said correlator is configured to perform a cross-correlation on the basis of a comparison between a stored version of a preamble pattern and a received version of a preamble pattern received in said selected part of said transmission bandwidth.

14. The receiving apparatus according to claim 13, further comprising a pilot rearranger configured to rearrange said received pilot signals into an original sequence in case that the selected part of said transmission bandwidth to which the receiver is tuned does not match with a preamble pattern structure.

15. The receiving apparatus according to claim 11, wherein each frame comprises at least two signaling patterns, each signaling pattern comprising a same signaling data mapped onto frequency carriers, said receiving apparatus further comprising a reconstructor configured to reconstruct an original signaling pattern from said received selected part of said transmission bandwidth.

16. The receiving apparatus according to claim 15, wherein said reconstructor is configured to rearrange received signaling signals into the original signaling pattern in case that the selected part of said transmission bandwidth to which the receiving means is tuned does not match with a signaling pattern structure.

17. The receiving apparatus according to claim 15, wherein said reconstructor is configured to perform an error correction decoding on said received signaling signals in order to reconstruct the original signaling pattern.

18. The receiving apparatus according to claim 15, wherein said receiver is configured to be tuned to and to receive the selected part of said transmission bandwidth so that an optimized receipt of a signaling pattern in the selected part of said transmission bandwidth to be received is enabled.

19. The receiving apparatus according to claim 11, wherein said receiver is configured to be tuned to and to receive the selected part of said transmission bandwidth so that said at least one data pattern to be received is centered in relation to the selected part of said transmission bandwidth to be received.

20. The receiving apparatus according to claim 11, wherein said receiver is configured to be tuned to and to receive the selected part of said transmission bandwidth on the basis of signaling information received in a signaling pattern of a previous frame.

21. A receiving method for receiving signals transmitted in a multi-carrier system on the basis of a frame structure in a transmission bandwidth, each frame comprising at least two preamble patterns adjacent to each other in the frequency direction, each with pilot signals mapped on frequency carriers and at least two data patterns following the at least two preamble patterns, wherein all data patterns following each other in the time direction have the same frequency direction structure, said at least two data patterns having data mapped on frequency carriers, each of said at least two preamble patterns having a same length, each of the at least two preamble patterns and the at least two data patterns comprising a plurality of frequency carriers, the method comprising:

receiving a selected part of said transmission bandwidth, said selected part of said transmission bandwidth having at least a length of one of said at least two preamble patterns and covering at least one data pattern to be received, and performing a correlation on the basis of the pilot signals received in said selected part of said transmission bandwidth.

22. A system for transmitting and receiving signals, comprising a transmitting apparatus according to claim 1, and a receiving apparatus comprising:

a receiver configured to be tuned to and to receive a selected part of said transmission bandwidth, said selected part of said transmission bandwidth having at least a length of one of said at least two preamble patterns and covering at least one data pattern to be received, and a correlator configured to perform a correlation on the basis of the pilot signals received in said selected part of said transmission bandwidth.

23. A method for transmitting and receiving signals, comprising a transmitting method for transmitting signals in a multi-carrier system on the basis of a frame structure, said transmitting method comprising:

forming frames of said frame structure, each frame comprising at least two preamble patterns adjacent to each other in the frequency direction and at least two data patterns following the at least two preamble patterns, wherein all data patterns following each other in the time direction have a same frequency direction structure, each of the at least two preamble patterns and the at least two data patterns comprising a plurality of frequency carriers, wherein a length of each of the at least two preamble patterns is equal to or smaller than the effective receiving bandwidth of a receiving apparatus configured to receive said signals, mapping pilot signals on frequency carriers of each of said at least two preamble patterns in a frame, each preamble pattern having a same length, mapping data on frequency carriers of said at least two data patterns in a frame, transforming said at least two preamble patterns and said at least two data patterns from the frequency domain into the time domain in order to generate a time domain transmission signal, and transmitting said transmission signal, said method further comprising the receiving method according to claim 21.

\* \* \* \* \*